United States Patent Office 2,798,410
Patented July 9, 1957

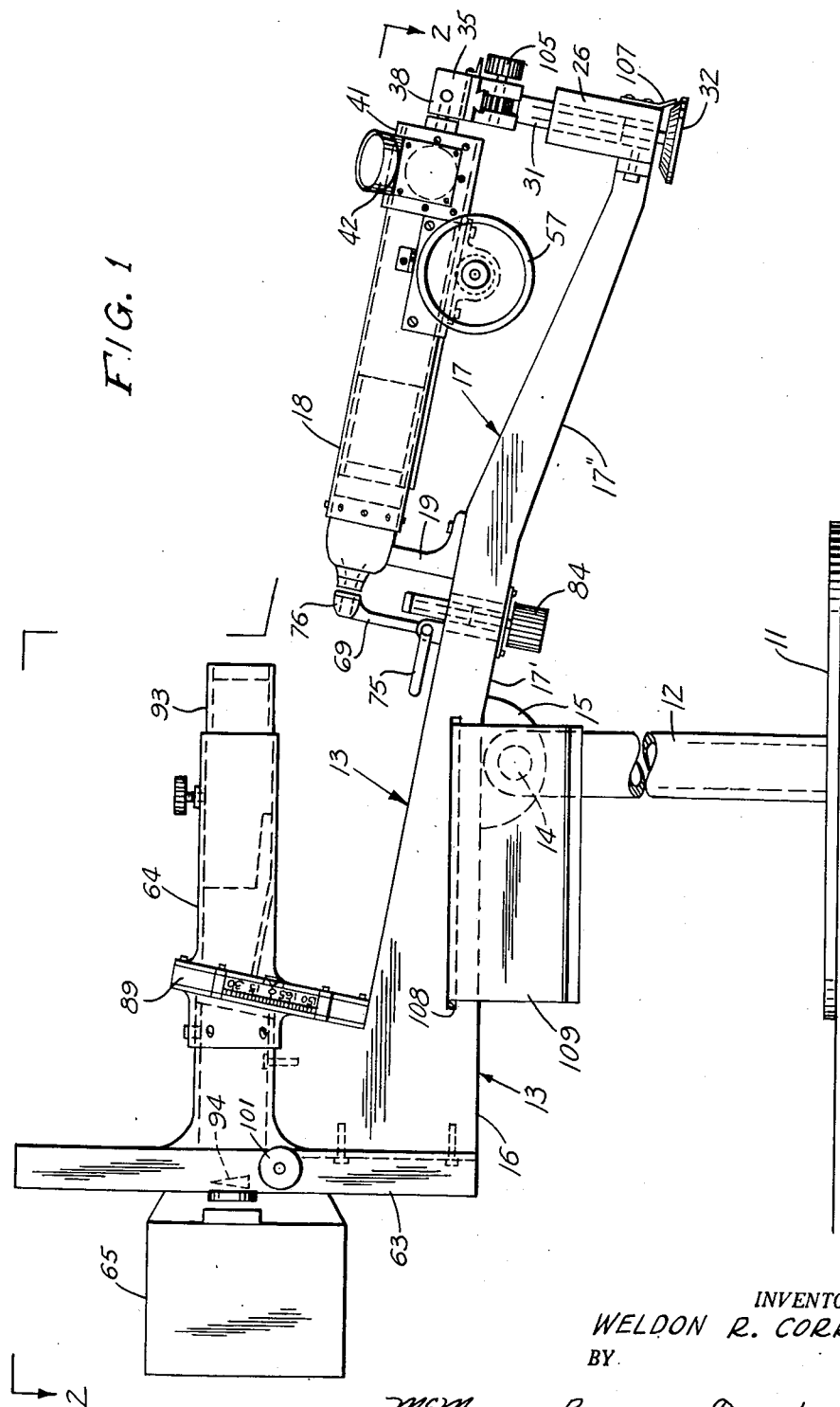

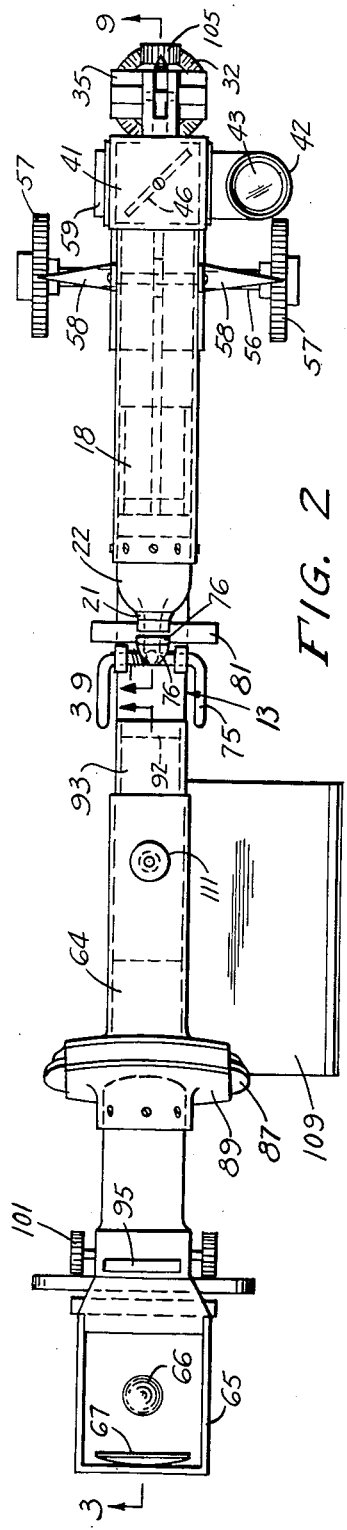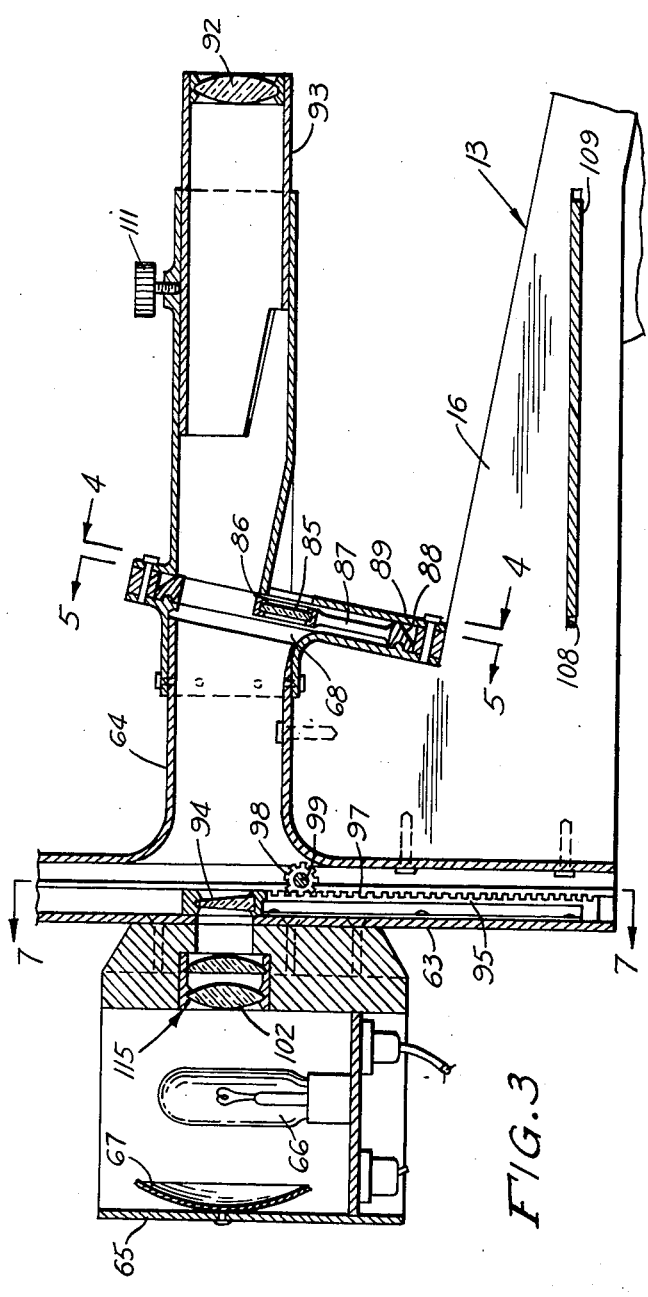

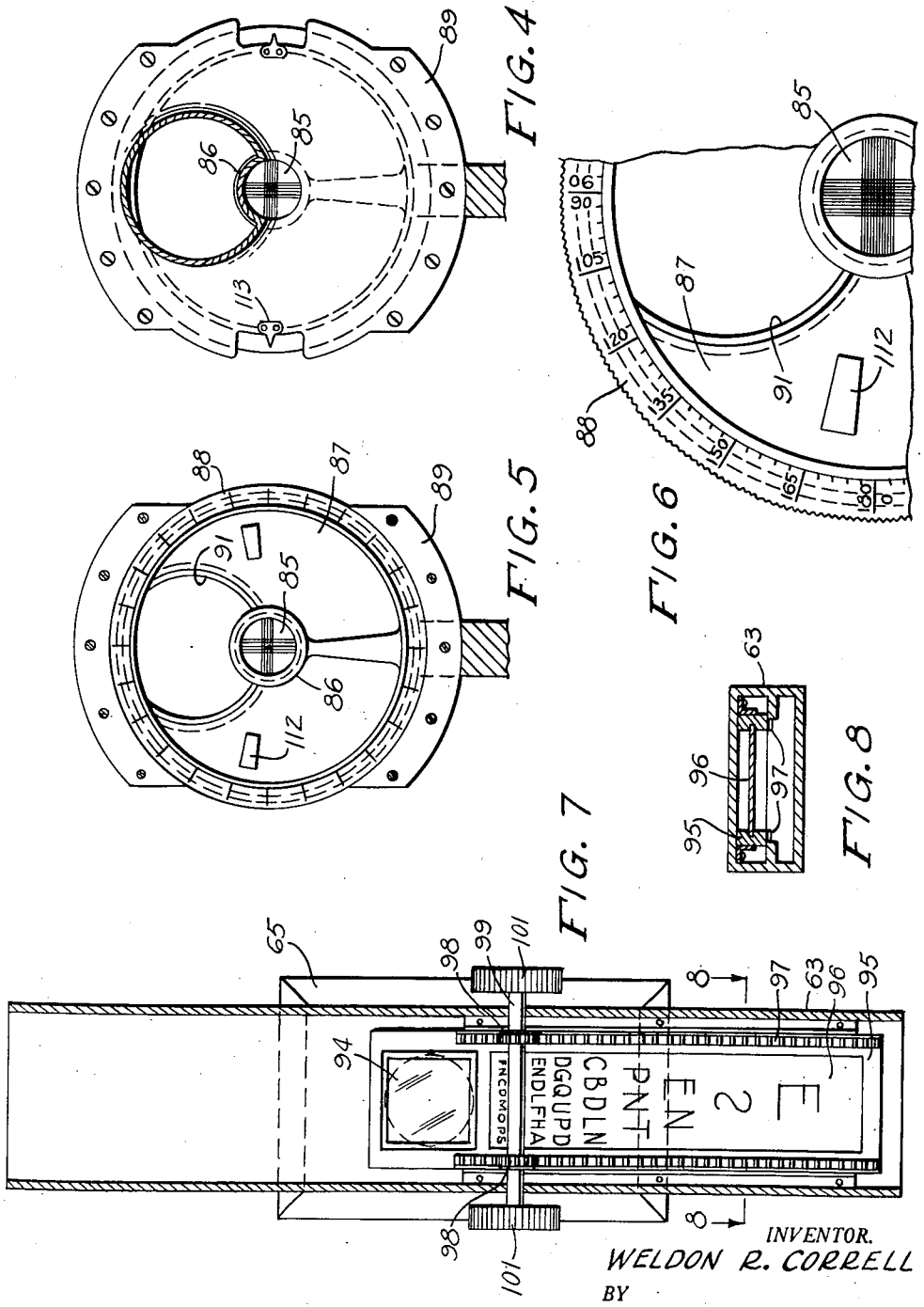

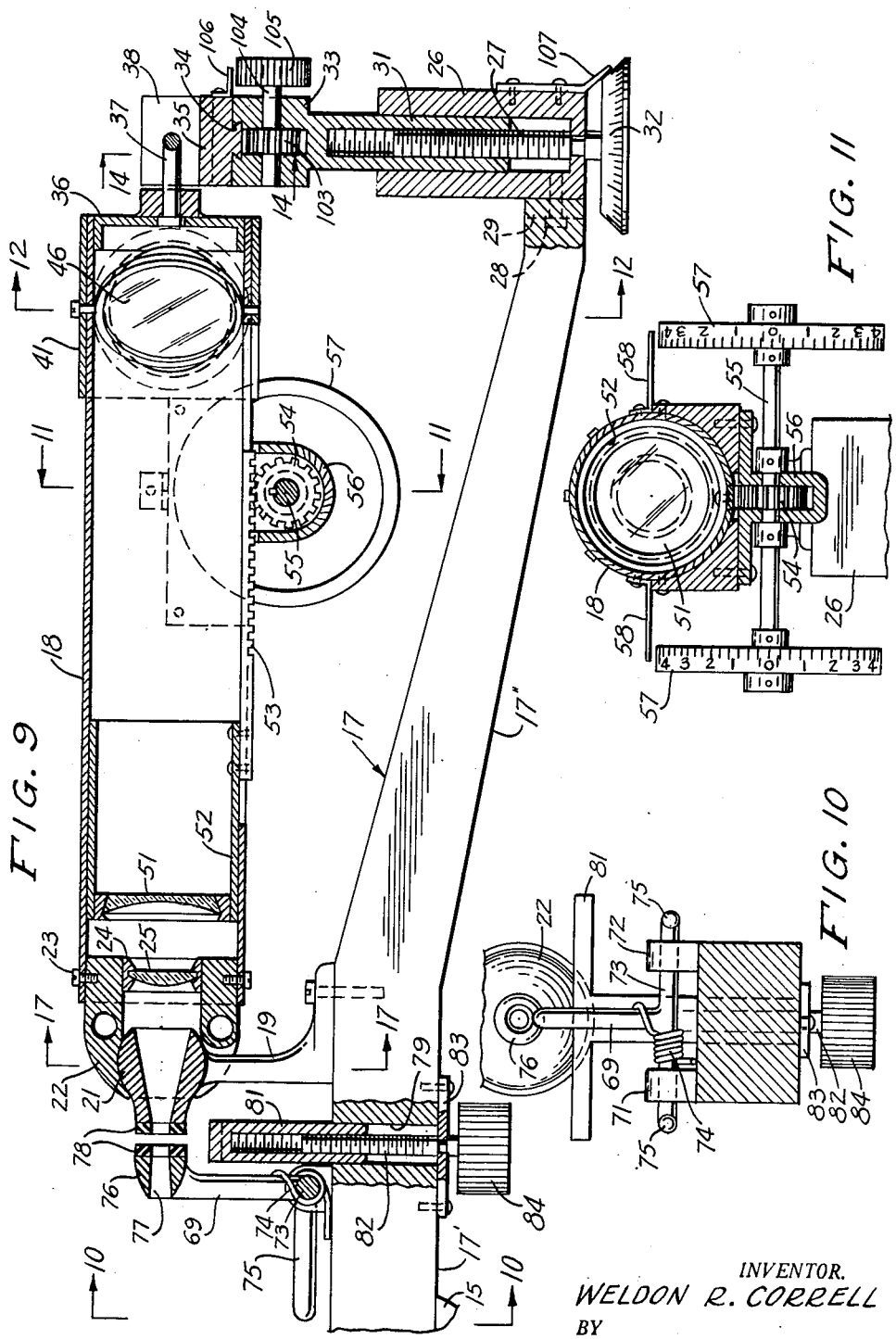

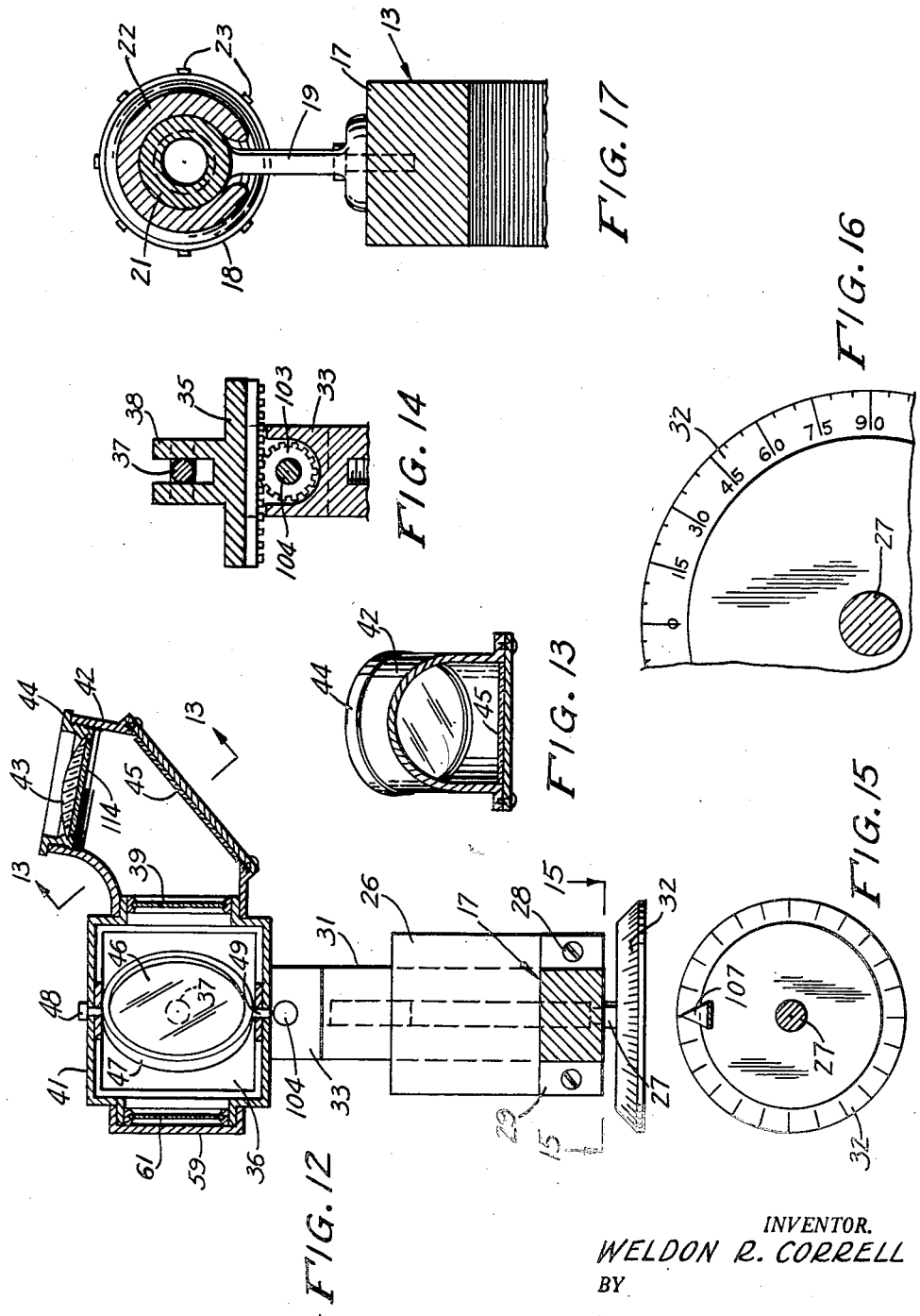

2,798,410

LENS MEASURING APPARATUS

Weldon R. Correll, Ellensburg, Wash.

Application February 24, 1956, Serial No. 567,591

3 Claims. (Cl. 88—56)

The present invention relates to an apparatus for measuring the focal length and other characteristics of an ophthalmic lens.

An object of the present invention is to provide a lens-measuring apparatus which enables a refractionist to quickly and accurately measure the focal length, the spherical and cylindrical powers, and the prismatic powers of an ophthalmic lens.

Another object of the present invention is to provide an apparatus for measuring the characteristics of an ophthalmic lens which enables a refractionist to visually demonstrate the optical defects in an ophthalmic lens.

A further object of the present invention is to provide an apparatus for measuring the characteristics of an ophthalmic lens which is compact and simple in structure, one which requires a minimum of space and is so constructed as to be easily movable into a position of use, one which is economical to manufacture and assemble, and one which is highly effective in action.

These and other objects and advantages of the present invention will be fully apparent from the following description when taken in connection with the annexed drawings, in which:

Figure 1 is a side elevational view of the lens-measuring apparatus of the present invention;

Figure 2 is a plan view of the assembly of Figure 1,

Figure 3 is a sectional view, on an enlarged scale, taken on the line 3—3 of Figure 2, Figure 4 is a sectional view, on an enlarged scale, taken on the line 4—4 of Figure 3, Figure 5 is a sectional view, on an enlarged scale, taken on the line 5—5 of Figure 3, Figure 6 is a fragmentary view, on an enlarged scale, of a portion of the astigmatic chart lens support seen in Figure 5, Figure 7 is a sectional view, on an enlarged scale, taken on the line 7—7 of Figure 3, Figure 8 is a sectional view taken on the line 8—8 of Figure 7, Figure 9 is a sectional view, on an enlarge scale, taken on the line 9—9 of Figure 2, Figure 10 is a sectional view taken on the line 10—10 of Figure 9, Figure 11 is a sectional view taken on the line 11—11 of Figure 9, Figure 12 is a sectional view taken on the line 12—12 of Figure 9, Figure 13 is a sectional view taken on the line 13—13 of Figure 12, Figure 14 is a sectional view taken on the line 14—14 of Figure 9, Figure 15 is a sectional view taken on the line 15—15 of Figure 12, Figure 16 is a fragmentary view of the dial of Figure 15, and Figure 17 is a sectional view taken on the line 17—17 of Figure 9.

Referring in greater detail to the drawings in which like numerals indicate like parts throughout the several views, the lens-measuring apparatus of the present invention comprises a base 11, a standard 12 rising from the base 11, and a horizontally-disposed platform 13 supported intermediate its ends on the standard 12 for tilting movement about a first horizontal axis, the axis being a horizontally-disposed pin 14 extending through a hole in the upper end of the standard 12 and through aligned holes in a hanger 15 which is dependingly secured to the underside of the platform 13. The platform 13 has a portion 16 extending from the pin 14 to one end thereof which is straight and has a remaining portion 17 which extends from the pin 14 to the other end of the platform 13 and slopes downwardly. A focusing tube 18 is positioned and supported above the platform sloping portion 17 and extends substantially parallel to the platform sloping portion 17.

Means is carried by the sloping portion 17 of the platform 13 adjacent the pin 14 for supporting one end of the focusing tube 18 for rocking movement about a second horizontal axis which is substantially parallel to the platform sloping portion 17. Specifically, this means consists in a vertically-extending post 19 which is secured by its lower end to the platform sloping portion 17 intermediate the ends of the latter. As seen in Figure 1, the sloping portion 17 of the platform 13 is in two sections, section 17' which is adjacent to the straight portion 16 and section 17" which extends from the section 17'. The post 19 rises from the end of the section 17' adjacent to its point of attachment to the section 17". The upper end of the post 19 is provided with a ball formation 21 which is received in a socket in one end of a coupling member 22. The coupling member 22 is secured by set screws 23 (Figure 9) in the adjacent end of the focusing tube 18 and supports within it a lens holder 24 and a lens 25. The connection of the ball formation 21 to the coupling member 22 permits rocking movement of the tube 18 about a second horizontal axis which is substantially parallel to the platform sloping portion 17.

Means is carried by the patform sloping portion 17 remote from pin 14 for supporting the other end of the tube 18 for limited swinging back and forth horizontal movement and for upward and downward vertical movement about the same second horizontal axis as a pivot. Specifically, this means consists in a vertically-disposed cylinder 26 having an open upper end and a closed lower end through which extends a threaded shaft 27. The cylinder 26 is fixed to the free end of the section 17" of the sloping portion 17 by means of a bolt 28 extending through a flange 29 formed on the end of the section 17". An upright hollow post 31 having internal threads is threadedly engaged with the shaft 27 for upward and downward movement in response to the turning movement of the shaft 27. The lower end of the shaft 27 carries a hand wheel 32 having scale indicia on its beveled upper face, as shown in Figures 12 and 15.

The upper end of the post 31 carries a block 33 having a dovetailed slideway 34 therein for the support of a slide 35, the latter supporting the other end of the focusing tube 18 for its swinging back and forth horizontal movement. The end of the tube 18 remote from the end of the coupling member 22 is provided with a closure member 36 having a T-shaped pin 37 projecting from its outer face and received between the arms 38 which are carried by the slide 35.

A viewing and measuring screen 39 is disposed on one side of the focusing tube 18 adjacent to the end of the tube having the closure member 36 and is connected in communication with the interior of the tube 18 inwardly of the adjacent end of the latter.

A rectangular casing 41 carried on the exterior of the tube 18 adjacent the closure member 26 forms a support for the screen 39 and a viewing member 42, as seen in Figures 12 and 13. A magnifying lens 43 mounted in a threaded bezel 44 is opposed to a mirrored surface 45 carried by the viewing member 42. A mirror 46 mounted in a ring 47 is carried within the casing 41 for rotation about a vertical axis, the axis comprising pivot pins 48 and 49 at the top and bottom of the ring 47, respectively. The mirrored surface 45 and the mirror 46 constitute a projecting mirror system mounted in the tube 18 for cooperation with the screen 39.

A lens system is mounted in the tube 18 between the one end having the coupling member 22 and the end having the mirror 46 and includes a lens 51 carried by one end of a horizontally-disposed sleeve 52 which is slidably mounted so as to provide movement for the lens 51 toward and away from the mirror 46. As seen most clearly in Figures 9 and 11, a rack 53 is secured to the underside of the other end of the sleeve 52 and is in mesh with a pinion gear 54 mounted upon the intermediate portion of a transversely extending shaft 55 which is journaled on each side of the gear 54 in a hanger 56 depending from and fixedly secured to the underside of the focusing tube 18. A hand wheel 57 is mounted upon each end of the shaft 55 and a pointer 58 carried by the focusing tube 18 extends over the periphery of each of the hand wheels 57 and cooperates with the indicia provided thereon to indicate the distance of movement of the lens 51 toward and away from the mirror 46. Stop means (not shown) maintains the mirror 46 in either one of two positions at an angle of 45° to the axis of the focusing tube 18. The side of the casing 41 opposite to the viewing member 42 is provided with a closure member 59 covering a screen 61 which is identical with the screen 39. The viewing member 42 may be mounted upon a side of the casing opposite to its position in Figure 12 by removing the closure member 59 and substituting the viewing member 42 for the closure member 59 and the closure member 59 for the viewing member 42.

In Figures 1 to 3, inclusive, a light-projecting assembly 62 is positioned above the straight portion 16 of the platform 13 and includes an upstanding casing 63, a horizontally-disposed tunnel member 64, the latter being positioned so as to project from the front face of the casing 63 with one end connected in communication with the casing 63, and a housing 65 constituting a light-projecting source connected in communication with the back face of the casing 63. The housing includes, as seen in Figure 3, an incandescent light bulb 66 and a concave mirror 67 positioned on the rear wall of the housing 65 so as to project the light from the bulb 66 into an opening in the front wall of the housing 65. The assembly 62 is positioned with respect to the platform 13 so that the tunnel member 64 extends horizontally over and is spaced from the platform straight portion 16 and is fixedly secured to the platform straight portion 16. The underside of the tunnel member 64 is provided with an opening intermediate its ends as indicated by the reference numeral 68 in Figure 3.

A vertically-disposed post 69 is positioned adjacent the longitudinal axis of the focusing tube 18 and has its lower end fixed to the section 17' of the sloping portion 17 of the platform 13. As seen most clearly in Figures 9 and 10, the connection of the post 69 to the sloping portion 17 of the platform 13 includes a pair of apertured lugs 71 and 72 secured to the upper face of the sloping portion 17 and receiving a shaft 73 which is formed integrally with the post 69 and extends transversely of the post 69. A coil spring 74 has one end bearing against the sloping portion 17 of the platform 13 and is wound around one portion of the shaft 73 and has its other end looped around the lower end of the shaft 69. The connection of the shaft 73 in the lugs 71 and 72 provides for movement of the post 69 from the vertical position to a position longitudinally of and away from the adjacent end of the focusing tube 18. The spring 74 biases the post 69 towards its vertical position. The ends of the shaft 73 are bent so as to be in longitudinal alignment with the platform 13 to form handles 75 so that the post 69 may be manually moved from its vertical position to its longitudinal position.

The upper end of the post 69 carries a lens-supporting element 76 having an aperture 77 therethrough. The ball formation 21 is also apertured and resilient washers 78 on the confronting ends of the ball formation 21 and the lens-supporting element 76 provide means for receiving and supporting a lens to be measured therebetween. The sloping portion 17 of the platform 13 is provided with a bore 79 in which is slidably mounted a hollow standard 81. A bolt 82 extends into the standard 81 and is supported in the bore 79 by means of an apertured plate 83. A knurled handwheel 84 on the lower end of the bolt 82 provides means for rotating the latter to raise and lower the standard 81. The upper end of the standard 81 serves as a rest for the lens to be measured when the latter is received and held between the washers 78.

A lens 85 carrying an astigmatic chart is positioned in the tunnel member 64 so as to bridge the opening 68 therein and is connected to the tunnel member 64 for clockwise and counterclockwise movements with respect to the opening 68. The lens 85 is mounted in a ring 86 which forms the central portion of a circular plate member 87 having a beveled periphery on which is measuring indicia as at 88 in Figure 6. The plate member 87 is supported within a circular housing 89 and has its periphery on both sides exposed so that the indicia upon its periphery may be conveniently read from each side of the instrument. The plate member 87 is provided with another opening 91 so that the light from the light bulb 66 may be projected through the tunnel member 64 and through a lens 92 which is supported in an adjustable sleeve 93 in the end of the tunnel member 64 remote from the casing 63.

Referring to Figures 3, 7, and 8, it will be seen that a prismatic lens 94 is positioned within the casing 63 and is carried upon the upper end of a slide 95 for upward and downward movement into and out of a position between the light bulb 66 and the adjacent end of the tunnel member 64 for projecting a light beam from the light bulb 66 through the opening 68 and upon a lens supported by the lens supporting element 76 when the lens is to be measured. The portion of the slide 95 beneath the prismatic lens 94 is translucent and carries a letter chart which may be projected by means of the lens 92 upon any vertical wall surface for testing a patient's eyesight in the conventional manner. The translucent portion of the slide 95 is indicated by the reference numeral 96. The side edges of the slide 95 are provided with racks 97 which are engaged by pinions 98 mounted upon a shaft 99 journaled in the casing 63 and provided with handwheels 101 for manually shifting the slide 95 upwardly and downwardly to bring either the prismatic lens 94 or the translucent portion 96 of the slide 95 into position bridging the opening in the casing 63. A condensing lens 102 mounted in the housing 65 between the light bulb 66 and the casing 63 serves to concentrate the light from the light-projecting source onto either the prismatic lens 94 or the translucent portion 96 of the slide 95.

Referring to Figures 9 and 14, the slide 35 is seen to be movably connected to the block 33 by means of a rack formed on the lower portion of the slide 35 and in mesh with a pinion gear 103 carried upon a shaft 104 journaled in the block 33. A handwheel 105 on the outer end of the shaft 104 provides means for manually shifting the adjacent end of the focusing tube 18 from side to side. The handwheel 32 provides means for manually adjusting the adjacent end of the focusing tube upwardly and downwardly. A pointer 106 fixed to the slide 35 cooperates with indicia provided on the periphery of the handwheel 105 and another pointer 107 carried on the cylinder 26 cooperates with indicia formed upon the periphery of the handwheel 32 to indicate the distance of movement of the adjacent end of the focusing tube 18 from side to side and upwardly and downwardly, respectively.

Substantially midlength of the straight portion 16 of the platform 13 is a slot 108 receiving a horizontally-disposed plate 109 forming a writing surface. The plate 109 may be projected from either side of the platform 13, depending upon which side of the instrument the operator is working from.

In operation, a lens to be measured is supported between the lens-supporting element 76 and the adjacent end of the ball formation 21, and the standard 81 is raised or lowered to bring that portion of the lens to be measured into registry with the aperture 77 in the lens-supporting element 76. At the same time, the prismatic lens 94 is shifted into position so that the light from the light bulb 66 is directed onto the lens 85. This causes the astigmatic chart on the lens 85 to be projected through the lens measured and onto the mirror 46 and thence onto the mirrored surface 45 within the viewing member 42. The characteristics of the lens will then result in the shifting of the image of the astigmatic chart either upwardly or downwardly and by measured movements of the adjacent end of the focusing tube 18, the prismatic powers of the lens may be measured. The spherical and cylindrical powers of the lens may be measured by rotating the lens 85 within the housing 89 and recording the movement of such rotation. The turning of the handwheel 57 on either side of the focusing tube 18 will move the lens 51 toward and away from the lens to be measured so as to provide means for focusing the image of the astigmatic chart upon the mirror system.

When it is desired to test the eyesight of a patient, the operator shifts the slide 95 so that the desired letters on the chart printed on the translucent portion 96 of the chart bridge the opening in the casing and are projected by means of the lens 92 upon a vertical wall surface. The sleeve 93 is movable in the adjacent end of the tunnel member 64 and a set screw 111 is provided for locking it in any adjusted position.

The viewing member 42 is shiftable to either side of the focusing tube 18 and the operator may operate the instrument from either side as is most convenient for him. The operator may demonstrate by means of the viewing member 42 the prismatic characteristics of the lens and may visibly demonstrate to the patient such characteristics. Stops 112 project from the face of the plate member 87 to prevent rotation of the plate 87 more than is necessary to shift the lens 85 carrying the astigmatic chart. Pointers 113 carried upon the housing 89 indicate the distance of rotation of the lens 85 and serve to indicate the distance of movement necessary to align the astigmatic chart so that the operator or refractionist may accurately measure the lens under examination.

A red color filter 114 (Figure 12) is positioned beneath the magnifying lens 43 in the viewing member 42 to correct the color aberration of the projected image. In the housing 65, the condensing lens 102 is part of a lens assembly 115 which is threaded into the inner wall of the housing 65.

What is claimed is:

1. A lens-measuring apparatus comprising a base, a standard rising from said base, a horizontally-disposed platform supported intermediate its ends on said standard for tilting movement about a first horizontal axis, said platform having a portion extending from said axis to one end thereof which is straight and having the remaining portion extending from said axis to the other end thereof which slopes downwardly, a focusing tube positioned above and spaced from said platform sloping portion, means carried by said sloping portion of said platform adjacent said first axis and supporting one end of said tube for rocking movement about a second horizontal axis, means carried by said platform sloping portion remote from said first axis and supporting the other end of said tube for limited swinging back and fourth horizontal movement and for up and down vertical movement about said second horizontal axis as a pivot, a viewing and measuring screen disposed on one side of said tube inwardly of the other end thereof and connected in communication with the interior of said tube, a projecting mirror system mounted in said tube for cooperation with said screen, a lens system mounted in said tube between said one end thereof and said mirror system, said lens system including a lens mounted in said tube for movement toward and away from said mirror system, a light-projecting assembly including an upstanding casing, a horizontally-disposed tunnel member positioned so as to project from the front face of said casing and having one end connected in communication with said casing, and a light-projecting source connected in communication with the back face of said casing positioned so that the tunnel member extends horizontally over and is spaced from said platform straight portion, said assembly being fixedly secured to said platform straight portion, said tunnel member having an opening intermediate the ends thereof, support means adjacent said second axis and carried by said platform sloping portion for receiving a lens to be measured, a lens carrying an astigmatic chart positioned in said tunnel member so as to bridge said opening in said tunnel member and connected to the tunnel member for clockwise and counterclockwise movement with respect to said opening, a prismatic lens positioned within said casing, and movable into a position between the light-projecting source and said one end of said tunnel member for projecting a light beam from said light source through said opening upon a lens to be measured when the latter is received in said support means.

2. A lens-measuring apparatus comprising a base, a standard rising from said base, a horizontally-disposed platform supported intermediate its ends on said standard for tilting movement about a first horizontal axis, said platform having a portion extending from said axis to one end thereof which is straight and having the remaining portion extending from said axis to the other end thereof which slopes downwardly, a focusing tube positioned above and spaced from said platform sloping portion, means carried by said sloping portion of said platform adjacent said first axis and supporting one end of said tube for rocking movement about a second horizontal axis, means carried by said platform sloping portion remote from said first axis and supporting the other end of said tube for limited swinging back and forth horizontal movement and for up and down vertical movement about said second horizontal axis as a pivot, a viewing and measuring screen disposed on one side of said tube inwardly of the other end thereof and connected in communication with the interior of said tube, a projecting mirror system mounted in said tube for cooperation with said screen, a lens system mounted in said tube between said one end thereof and said mirror system, said lens system including a lens mounted in said tube for movement toward and away from said mirror system, a light-projecting assembly including an upstanding casing, a horizontally-disposed tunnel member positioned so as to project from the front face of said casing and having one end connected in communication with said casing, and a light-projecting source connected in communication with the back face of said casing positioned so that the tunnel member extends horizontally over and is spaced from said platform straight portion, said assembly being fixedly secured to said platform straight portion, said tunnel member having an opening intermediate the ends thereof, a vertically-disposed post positioned adjacent said second axis and having its lower end connected to said platform sloping portion for movement from the vertical position to a position longitudinally of and away from said tube one end, a lens-supporting element carried on the upper end of said post for receiving a lens to be measured, a lens carrying an astigmatic chart positioned in said tunnel member so as to bridge said opening in said tunnel member and connected to the tunnel member for clockwise and counterclockwise movement with respect to said opening, a prismatic lens positioned within said casing and movable into a position between the light-projecting source and said one end of said tunnel member for projecting a light beam from said light source through said opening upon a lens to be measured when the latter is received in said lens-supporting element.

3. A lens-measuring apparatus comprising a base, a standard rising from said base, a horizontally-disposed platform supported intermediate its ends on said standard and for tilting movement about a first horizontal axis, said platform having a portion extending from said axis to one end thereof which is straight and having the remaining portion extending from said axis to the other end thereof which slopes downwardly, a focusing tube positioned above and spaced from said platform sloping portion, means carried by said sloping portion of said platform adjacent said first axis and supporting one end of said tube for rocking movement about a second horizontal axis, means carried by said platform sloping portion remote from said first axis and supporting the other end of said tube for limited swinging back and forth horizontal movement and for up and down vertical movement about said second horizontal axis as a pivot, a viewing and measuring screen disposed on one side of said tube inwardly of the other end thereof and connected in communication with the interior of said tube, a projecting mirror system mounted in said tube for cooperation with said screen, a lens system mounted in said tube between said one end thereof and said mirror system, said lens system including a lens mounted in said tube for movement toward and away from said mirror system, a light-projecting assembly including an upstanding casing, a horizontally-disposed tunnel member positioned so as to project from the front face of said casing and having one end connected in communication with said casing, and a light-projecting source connected in communication with the back face of said casing position so that the tunnel member extends horizontally over and is spaced from said platform straight portion, said assembly being fixedly secured to said platform straight portion, said tunnel member having an opening intermediate the ends thereof, a vertically-disposed post positioned adjacent said second axis and having its lower end connected to said platform sloping portion for movement from the vertical position to a position longitudinally of and away from said tube one end, a lens-supporting element carried on the upper end of said post for receiving a lens to be measured, spring means biasing said post to its vertical position, a lens carrying an astigmatic chart positioned in said tunnel member so as to bridge said opening in said tunnel member and connected to said tunnel member for clockwise and counterclockwise movements with respect to said opening, a prismatic lens positioned within said casing and movable into a position between the light-projecting source and said one end of said tunnel member for projecting a light beam from said light source through the opening upon a lens to be measured when the latter is received in said lens-supporting element.

No references cited.